Patented June 10, 1941

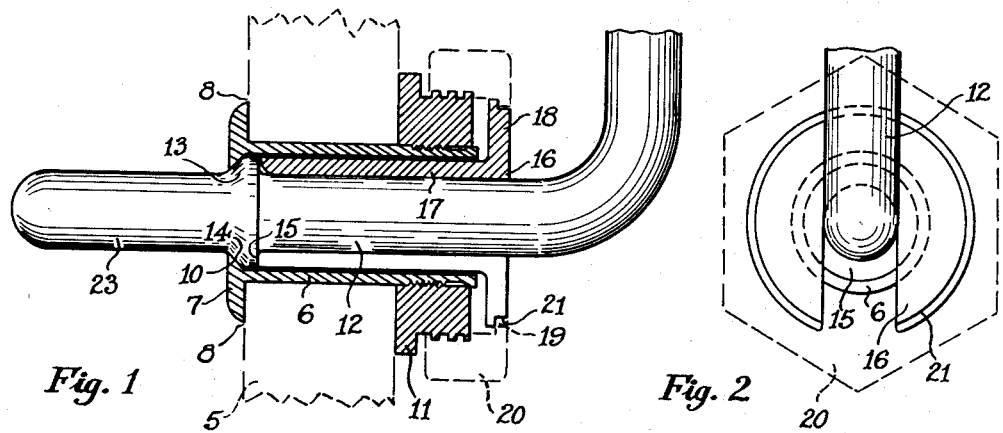
Fig. 1
Fig. 2
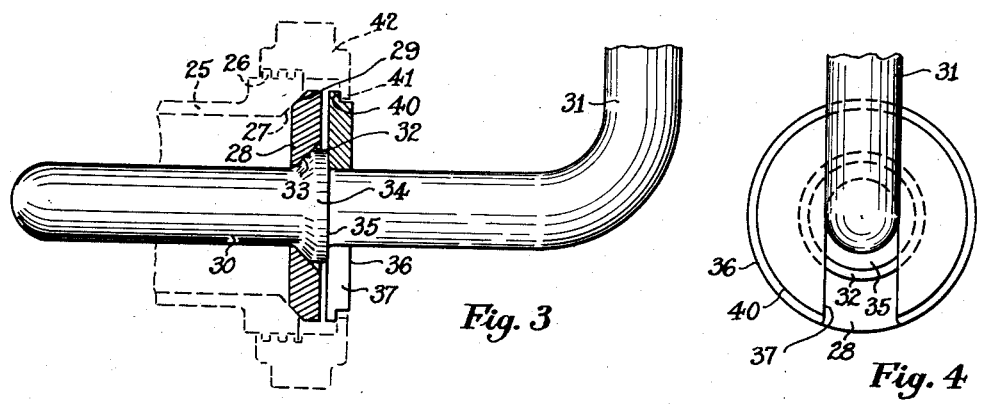
Fig. 3
Fig. 4
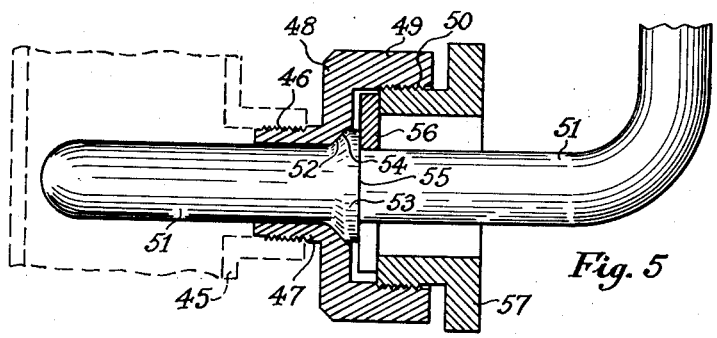
Fig. 5
INVENTOR.
RAYMOND E. OLSON
BY D. Clyde Jones
ATTORNEY.

2,244,798

UNITED STATES PATENT OFFICE 2,244,798

SANITARY FITTING FOR THERMOMETERS

Raymond E. Olson, Pittsford, N. Y., assignor to Taylor Instrument Companies, Rochester, N. Y., a corporation of New York Application March 28, 1940, Serial No. 326,446

7 Claims. (Cl. 73—375)

This invention relates to fittings for industrial thermometers of the type used for controlling the pasteurization of milk or the like.

In pasteurizing apparatus, it is essential that all parts of the apparatus which come in contact with milk or other liquid should be free from crevices in which bacteria can lodge. Furthermore, these fittings should be of such construction that they can be readily disassembled for cleaning and then quickly reassembled for use.

Prior fittings which have been widely used for the mentioned purpose are disclosed in the patents to Maurer No. 1,233,385, to Clawson No. 1,609,606 and to Swift No. 1,890,006. In the constructions disclosed in the mentioned patents to Maurer and Clawson it is necessary to provide the thermometer with a swivel attaching nut which is so mounted that normally it cannot be removed from the thermometer. The use of such a swivel nut has encountered some unfavorable criticism from health inspectors, since there is a possibility of bacteria lodging between the swivel nut and the thermometer proper. While it is true that the swivel nut does not encounter the milk being pasteurized, nevertheless it is a fact that the inner surface of this nut, as well as adjacent parts of the thermometer, can not be readily cleaned. While the fitting disclosed in the Swift Patent No. 1,890,006 can be completely disassembled, it is not convenient to take apart this fitting daily and therefore bacteria can accumulate around the swivel nut mounted thereon. Furthermore, since this last-mentioned fitting is adjustable to grip any part of the bulb of the thermometer, unless the operator exercises care, the fitting can be clamped on the bulb in such a position as to afford improper immersion of the bulb in the milk or liquid.

In accordance with the present invention there is provided a thermometer fitting which obviates the need of a swivel nut permanently mounted on the thermometer and which is of such construction that when the thermometer is removed from the tank or pipe line with which it is used, all parts of the fitting will be disassembled for easy cleaning and yet it is impossible to assemble the fitting incorrectly.

The various features and advantages of the invention will appear from the detailed description and claims in which Fig. 1 is a vertical section through a fitting made in accordance with this invention; Fig. 2 is a view looking from the right of Fig. 1; Fig. 3 is a vertical section of a modified fitting made in accordance with the present invention; Fig. 4 is a view looking from the right of Fig. 3; and Fig. 5 is a vertical section of a still further modified fitting made in accordance with the present invention.

In Figs. 1 and 2 there is illustrated one form of the invention which is particularly adapted for application in an opening in the side walls of a tank or vat 5. This form of the fitting includes a sleeve 6 extending through the opening in the vat wall. At one end of the sleeve there is provided a radially projecting annular flange 7, the exposed surface of which curves down to the inner surface of the vat with which the other surface of the flange engages. If desired, the joint between the flange and the inner wall of the vat may be welded or closed by solder, as indicated at 8, so that there will be no crack or crevice between these parts. The flange is provided internally with a conical seat 10 tapering to a sharp edge at the opening through the sleeve. The other end of the sleeve is externally threaded to receive a fastening nut 11 by which the sleeve is snugly anchored in the opening of the side wall of the vat. The bore through the sleeve 6 is of a size to receive with an interspace therebetween, a metallic stem 12 of a thermometer of any conventional design. The metal thermometer stem 12 has formed thereon an integral ferrule 13, the surface of which adjacent the free end of the bulb is shaped to have a male conical seat 14 with a taper conforming to the taper of the conical seat 10 of the sleeve. Thus these two seats, when tightly held in engagement, will prevent the passage of milk or other liquid therebetween. The surface of the ferrule remote from the free end of the stem is made with a shoulder 15 against which suitable means can be forced to bring the seats on the ferrule and on the sleeve into liquid-tight engagement. In accordance with the present invention there is provided means including a U-shaped member 16 for effecting this result.

In Fig. 1, this U-shaped member 16 comprises a tube or sleeve 17 of a diameter to fit into the interspace between the sleeve 6 and the thermometer stem 12 with one of its ends engaging the ferrule on the stem. The other end of this tube is provided with a radially projecting circular plate 18 integral therewith which plate has opposing parallel surfaces extending at right angles to the principal axis of the tube. Both the tube 17 and the plate 18 attached thereto, are slotted into U-shaped form to receive the stem 12 laterally therethrough. The slotted circular plate is of such size that it will engage the flange 19 on a clamping nut 20 which is internally threaded to engage the fastening nut 11. It is desirable to have a peripheral recess in the mentioned plate, thereby affording a shoulder 21 to properly position the plate within the flange 19 of the clamping nut.

It will be understood that when it is desired to disassemble the fitting from the vat, as shown in Fig. 1, the clamping nut 20 is removed, after which the thermometer bulb 23, stem 12 and the U-shaped member 16 are withdrawn from the sleeve 6. When thus withdrawn, the stem can be separated from the member 16 by passing it laterally through the slot in this member. The clamping nut 20 can then be removed from the stem 12.

In the modified form of the invention illustrated in Figs. 3 and 4, the invention is shown as applied to a milk pipe line. The section 25 of this line has external threads 26 at one end thereof and terminates in a female conical seat 27. A washer 28 of a diameter slightly smaller than the external diameter of the pipe section 25, is provided at one surface with a male conical seat 29 to cooperate with the seat 27 of this pipe section. The washer is provided with a central aperture of a size to receive the stem 30 of a conventional thermometer 31. The other surface of the washer has a female conical seat 32 defining said central aperture, to cooperate with the conical seat 33 on the ferrule 34 which is formed integral with the stem of the thermometer. The ferrule also has a shoulder 35 to be engaged by a U-shaped member or horse-shoe washer 36. This washer which has approximately the same diameter as that of the washer 28, has a slot 37 therein to receive the thermometer stem. The washer 36 preferably has an annular shoulder 40 to be engaged by the flange 41 on a clamping nut 42, which is adapted to have threaded engagement with the external threads 26 on the pipe section 25.

It will be understood that in assembling the fitting just described, the stem 30 of the thermometer is inserted through nut 42 and through the washer 28 until the seat 33 on the thermometer ferrule engages the seat 32 on the washer 28. The U-shaped washer 36 is placed on the stem 30 between the nut 42 and the washer 28. The parts in the relation just mentioned are assembled in the pipe section 25, the free end of the thermometer being received into the open end of the pipe section. The nut 42 is then screwed tightly onto the threaded portion of the pipe section to clamp the parts snugly together. The seat 27 on the pipe section and the seat 29 on the washer 28 then affords a liquid-tight joint. Similarly, the internal seat 32 on the washer 28 and the seat 33 on the ferrule 34 also provide a joint through which liquid will not pass. It will be noted that no captive swivel nut is used but instead, all of the several parts of the fitting can be disassembled for cleaning. When it is desired to disassemble the fitting, the nut 42 is unscrewed from the pipe section. The washer 28 can then be removed longitudinally of the stem and the U-shaped washer 36 can be withdrawn transversely of the stem by passing the stem through the slot in the washer. With this U-shaped washer removed the nut 42 can be removed from the stem.

The foregoing arrangements are used where sanitary requirements are especially exacting. However, it is desirable to use the present thermometer stem with its integral ferrule in other arrangements which do not need to meet the requirements of the health code. Therefore in the modified form of the invention shown in Fig. 5, the fitting is shown applied to a section of pipe 45 used to conduct water or the like. The end portion of this pipe is internally threaded as indicated at 46 to receive the externally threaded portion 47 of a hub 48, which hub is provided with a circular flange 49 projecting away from said threaded portion 47. This flange is internally threaded as indicated at 50. The hub 48 has an opening therethrough of a size to receive the thermometer stem 51 of a conventional thermometer, the opening being defined by a female conical seat 52 on the hub. This stem is provided with a ferrule 53 having a male conical seat 54 and an opposing shoulder 55. This male conical seat 54 on the ferrule is of a size to cooperate with the female conical seat 52 defining the opening through the hub. A U-shaped washer 56 has a slot therethrough of a size to receive the stem 51 of the thermometer and engages the shoulder 55 on the ferrule. This U-shaped washer 56 is of a diameter slightly smaller than the internal diameter of the flange 49 on the hub 48. A clamping nut 57 is externally threaded to engage the internal threads 50 on the hub flange 49 with the end of the nut forcing the washer 56 against the shoulder 55 on the ferrule of the thermometer stem. By this construction it will be seen that the engaging conical seats respectively on the hub 48 and on the ferrule 53 afford a liquid-tight joint between these parts. When it is desired to disassemble this fitting, the nut 57 is unscrewed from the flange 50 of the hub 48 and the thermometer is withdrawn longitudinally from the hub. The washer 56 is then removed transversely of the stem 51 by passing the stem through the slot in the washer. With the washer 56 removed from the stem 51, the nut 57 can be removed from the stem.

I claim:

1. In combination, a receptacle wall having an aperture therein, a tubular sleeve fitting the aperture, said sleeve having at one end thereof a flange engaging the inner surface of said wall and having an internal conical seat at approximately said surface, a thermometer stem of a size to project through said sleeve leaving an interspace therebetween, said thermometer stem having an integral ferrule provided with a circumferential conical seat to engage said first-mentioned seat and also provided with an opposing shoulder, a U-shaped sleeve projecting into said interspace with an end of said sleeve engaging said shoulder, a fastening nut engaging the other end of said tubular sleeve and the outer surface of said receptacle wall to anchor said tubular sleeve in said wall, and a clamping nut engaging the other end of said U-shaped sleeve and in screw-threaded engagement with said fastening nut, said clamping nut being of a size to receive said ferrule therethrough.

2. A fitting for use with a thermometer stem provided with an integral ferrule having a circumferential male conical seat and an opposing shoulder, said fitting comprising a member with a bore therethrough of approximately the diameter of said thermometer stem, said member having a female conical seat around said bore of a size to cooperate with said male seat, a U-shaped member having parallel faces, one of said faces engaging the shoulder on said stem, and means including a clamping nut cooperating with the other face of said U-shaped member for forcing said members toward each other whereby said seats are held tightly in engagement, said stem with its ferrule being removable through the bore of said clamping nut.

3. In combination with a thermometer stem provided with a ferrule having a circumferential male conical seat and an opposing shoulder, a part having an opening therethrough, a member serving to close said opening, said member having an aperture therethrough of approximately the diameter of said stem, said member also having a female conical seat defining said aperture, a U-shaped member having parallel faces, one of said faces engaging said shoulder, and means including a clamping nut cooperating with the other face of said U-shaped member for holding said part and said members in fixed relation with said thermometer ferrule tightly clamped between said members, said stem with its ferrule being removable through the bore of said clamping nut.

4. In combination, a receptacle wall having an aperture therein, a tubular sleeve fitting the aperture, said tubular sleeve having a female conical seat at approximately one surface of said wall, a thermometer stem of a size to project through said sleeve leaving an interspace therebetween, said thermometer stem having a circumferential integral ferrule provided with a circumferential conical seat to engage said first-mentioned seat and also provided with an opposing shoulder, a U-shaped sleeve projecting into said interspace with one end thereof engaging said shoulder, and means including a clamping nut for forcing said last-mentioned sleeve toward said female conical seat, said stem with its ferrule being removable through the bore of said clamping nut.

5. In combination, a receptacle wall having an aperture therein, a tubular sleeve fitting the aperture, said sleeve having at one end thereof a flange engaging the inner surface of said wall and having an internal conical seat at approximately said surface, a thermometer stem of a size to project through said sleeve leaving an interspace therebetween, said thermometer stem having a circumferential integral ferrule provided with a circumferential conical seat to engage said first-mentioned seat and also provided with an opposing shoulder, a U-shaped sleeve projecting into said interspace with an end of said sleeve engaging said shoulder, a fastening nut engaging the other end of said tubular sleeve and the outer surface of said receptacle wall to anchor said tubular sleeve in said wall, and a clamping nut for forcing said U-shaped sleeve lengthwise toward said shoulder, said stem with its ferrule being removable through the bore of said clamping nut.

6. In combination, a receptacle wall having an aperture therein, a tubular sleeve projecting through said aperture and having a radial flange engaging the inner surface of said wall, said flange having an internal conical seat defining the bore through said sleeve, means to anchor said sleeve in said aperture with said flange snugly engaging the inner surface of said receptacle wall, a thermometer stem of a size to project through said sleeve with an interspace therebetween, said stem having a circumferential ferrule provided with a conical seat to engage said first seat and also provided with an opposing shoulder, a U-shaped sleeve receivable in said interspace with one of its ends engaging said shoulder, and a clamping nut for forcing said last-mentioned sleeve toward said shoulder, said stem with its ferrule being removable through the bore of said clamping nut.

7. In combination, a receptacle wall having an aperture therein, a tubular sleeve projecting through said aperture and having a radial flange engaging the inner surface of said wall, said flange having an internal conical seat defining the bore through said sleeve, a fastening nut to anchor said sleeve in said aperture with said flange snugly engaging the inner surface of said receptacle wall, a thermometer stem of a size to project through said sleeve with an interspace therebetween, said stem having a circumferential ferrule provided with a circumferential conical seat to engage said first seat and also provided with an opposing shoulder, a U-shaped sleeve receivable in said interspace with one of its ends engaging said shoulder, and a clamping nut engaging said fastening nut for forcing said last-mentioned sleeve toward said shoulder, said stem with its ferrule being removable through the bore of said clamping nut.

RAYMOND E. OLSON.